United States Patent
Kim

(10) Patent No.: US 7,758,206 B2
(45) Date of Patent: Jul. 20, 2010

(54) BACKLIGHT ASSEMBLY WITH A METAL CONTAINER HAVING DIFFERENTLY DISTANT REGIONS FROM A VIRTUAL PLANE OF LAMPS AND LCD APPARATUS HAVING THE SAME

(75) Inventor: Yong-Il Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 70 days.

(21) Appl. No.: 11/213,183

(22) Filed: Aug. 25, 2005

(65) Prior Publication Data

US 2006/0044780 A1    Mar. 2, 2006

(30) Foreign Application Priority Data

Aug. 27, 2004   (KR)   .................. 10-2004-0067751

(51) Int. Cl.
*F21V 7/04*      (2006.01)
*F21V 7/10*      (2006.01)

(52) U.S. Cl. ............... 362/217.05; 362/225; 362/217.1; 362/249.01

(58) Field of Classification Search ................ 362/609, 362/613, 614, 330, 29, 30, 224, 225, 300, 362/341, 347, 348, 561, 560, 559, 362, 296, 362/297, 97, 218, 223, 241, 217, 237, 238, 362/240, 247, 260; 349/58, 59, 60, 67, 70
See application file for complete search history.

(56) References Cited

U.S. PATENT DOCUMENTS

| | | | | | |
|---|---|---|---|---|---|
| 3,009,053 | A | * | 11/1961 | Shaw et al. | 362/294 |
| 4,425,604 | A | * | 1/1984 | Imai et al. | 362/223 |
| 5,128,781 | A | * | 7/1992 | Ohno et al. | 349/65 |
| 5,253,151 | A | * | 10/1993 | Mepham et al. | 362/216 |
| 5,479,275 | A | * | 12/1995 | Abileah | 349/5 |
| 5,479,328 | A | * | 12/1995 | Lee et al. | 362/216 |
| 5,871,273 | A | * | 2/1999 | Shaw | 362/247 |
| 5,975,722 | A | * | 11/1999 | Van Duijneveldt | 362/296 |
| 5,986,728 | A | * | 11/1999 | Bernard | 349/68 |
| 5,993,027 | A | * | 11/1999 | Yamamoto et al. | 362/294 |
| 6,089,739 | A | * | 7/2000 | Yamamoto et al. | 362/561 |
| 6,095,656 | A | * | 8/2000 | Shimura et al. | 362/97 |
| 6,331,064 | B1 | * | 12/2001 | Nishiyama et al. | 362/260 |
| 6,336,728 | B1 | * | 1/2002 | Deloy | 362/614 |
| 6,407,781 | B2 | * | 6/2002 | Kitada | 349/58 |
| 6,428,183 | B1 | * | 8/2002 | McAlpin | 362/225 |
| 6,445,373 | B1 | * | 9/2002 | Yamamoto | 345/102 |
| 6,491,411 | B2 | * | 12/2002 | Itoh | 362/246 |
| 6,692,137 | B2 | * | 2/2004 | Blanchard | 362/241 |
| 6,793,361 | B2 | * | 9/2004 | Matsui | 362/97 |
| 7,104,671 | B2 | * | 9/2006 | Tseng et al. | 362/224 |
| 7,121,694 | B2 | * | 10/2006 | Hsieh et al. | 362/345 |
| 2003/0058635 | A1 | * | 3/2003 | Matsui | 362/97 |
| 2003/0223249 | A1 | * | 12/2003 | Lee et al. | 362/561 |
| 2003/0234896 | A1 | * | 12/2003 | Kim | 349/65 |
| 2004/0008524 | A1 | * | 1/2004 | Lee et al. | 362/561 |
| 2004/0032725 | A1 | * | 2/2004 | Hsieh et al. | 362/31 |
| 2004/0062034 | A1 | * | 4/2004 | Hsieh et al. | 362/97 |
| 2004/0076006 | A1 | * | 4/2004 | Mai | 362/241 |
| 2004/0114396 | A1 | * | 6/2004 | Kobayashi et al. | 362/561 |
| 2005/0002173 | A1 | * | 1/2005 | Chuang et al. | 362/31 |

FOREIGN PATENT DOCUMENTS

JP          04275525 A    * 10/1992

* cited by examiner

*Primary Examiner*—Ismael Negron
(74) *Attorney, Agent, or Firm*—Innovation Counsel LLP

(57) ABSTRACT

A backlight assembly includes a plurality of lamps emitting a first light. A optical member converts the first light to a second light having enhance optical characteristics. A receiving member receives the lamps and the optical member. The receiving member has protrusions that are aligned with the lamps and protrude away from the lamps. The protrusions increase the distance between the lamps and the receiving member.

25 Claims, 17 Drawing Sheets

BACKLIGHT ASSEMBLY WITH A METAL CONTAINER HAVING DIFFERENTLY DISTANT REGIONS FROM A VIRTUAL PLANE OF LAMPS AND LCD APPARATUS HAVING THE SAME

CROSS REFERENCE TO RELATED APPLICATION

This application claims priority under 35 USC §119 to Korean Patent Application No. 2004-67751 filed on Aug. 27, 2004, the content of which is herein incorporated by reference in its entirety for all purposes.

BACKGROUND OF THE INVENTION

1. Field of the Invention

The present invention relates to a backlight assembly and a liquid crystal display (LCD) apparatus having the backlight assembly. More particularly, the present invention relates to a backlight assembly that is capable of reducing the leakage current of a lamp, and an LCD apparatus having the backlight assembly.

2. Description of the Related Art

Recently, there has been much technical progress made with information-processing devices. As a part of this progress, much progress has also been made to display apparatuses that interface the data that is processed by the information-processing devices to convert the data to a user-recognized format.

An LCD apparatus, which is known for advantages such as light weight, small size, full-color, high resolution, etc., has been widely used in display apparatuses. The LCD apparatus converts variations of optical characteristics of a liquid crystal (LC) cell into visual variations. Since the LCD apparatus does not generate light on its own, a backlight assembly is employed in the LCD apparatus to act as the light source. The LCD apparatus displays an image by using the light from the backlight assembly.

The backlight assembly is classified as either a direct illumination type or an edge illumination type in accordance with positions of the light source. The direct illumination type backlight assembly includes a light source positioned under an LCD panel. Light emitted from the light source is directly irradiated onto an entire surface of the LCD panel. Since the direct illumination type backlight assembly utilizes more light sources than those of the edge illumination type backlight assembly, the direct illumination type backlight assembly generally has a higher luminance than the edge illumination type backlight assembly.

The direct illumination type LCD apparatus includes an LCD panel displaying an image and a backlight assembly providing the LCD panel with light.

FIG. 1 is a partial cross sectional view illustrating a conventional backlight assembly.

Referring to FIG. 1, a conventional backlight assembly includes a lamp 10, a light-diffusing member 30 placed over the lamp 10, a bottom chassis 50 located under the lamp 10, and a reflection plate 20 on the bottom chassis 50. Electrons move in the lamp 10 so that a current flows in the lamp 10. Meanwhile, since the bottom chassis 50 includes a conductive material, the lamp 10 and the bottom chassis 50 form a capacitor so that a leakage current is generated from the lamp 10. In general, the capacitance of the capacitor is inversely proportional to the distance between electrodes.

FIG. 15 is a graph illustrating luminance variations with respect to a length of the lamp from a first end to which a high voltage is applied to a second end to which a low voltage is applied. In FIG. 15, line I represents the luminance of the lamp 10 when a distance between the lamp 10 and the bottom chassis 50 is about one millimeter. Line II indicates the luminance of the lamp 10 when a distance between the lamp 10 and the bottom chassis 50 is about three millimeters. Line III represents the luminance of the lamp 10 when a distance between the lamp 10 and the bottom chassis 50 is about five millimeters. Line IV indicates the luminance of a separate lamp that is not assembled with a bottom chassis. As shown, the first ends of each of the lamps 10 have luminance levels higher than the first end of the separate lamp (IV). This is caused by increasing a current that is applied to the first ends of the lamps 10 to obtain a tubular current of about six milliamperes at the second ends of the lamps.

As shown in FIG. 15, the leakage current, which is indicated by the luminance drop with the length of the lamp, is reduced proportionally to an increase in the distance L1 between the lamp 10 and the bottom chassis 50. Thus, to obtain substantially the same tubular current at the second end of the lamp 10 as at the first end of the lamp 10, the initially applied high voltage is proportionally increased, as is the distance L1 between the lamp 10 and the bottom chassis 50. Thus, the distance L1 between the lamp 10 and the bottom chassis 50 is an important parameter for controlling the leakage current.

To prevent or reduce the leakage current of the lamp 10, the distance L1 between the lamp 10 and the bottom chassis 50 is increased. However, the lengthening of the distance L1 causes an increase of a thickness of the LCD apparatus. Thus, a method that allows a reduction in the lamp current leakage without undesirably increasing the thickness of the LCD apparatus is desired.

SUMMARY OF THE INVENTION

The present invention provides a backlight assembly that is capable of reducing a leakage current of a lamp. The present invention also provides an LCD apparatus having the above-mentioned backlight assembly.

A backlight assembly in accordance with one aspect of the present invention includes a lamp and a metal container. The lamp generates light. The metal container receives the lamp. The metal container includes a bottom plate having a first region and a second region. The lamp is disposed over the first region. A distance between a virtual plane, which is parallel to the bottom plate and passes through a center of the lamp, and the first region of the bottom plate is larger than a distance between the virtual plane and the second region of the bottom plate.

A backlight assembly in accordance with another aspect of the present invention includes a plurality of lamps emitting a first light. An optical member converts the first light into a second light having enhanced optical characteristics. A receiving member receives the lamps and the optical member. The receiving member has protrusions that are aligned with the lamps. The protrusions protrude away from the lamps.

A backlight assembly in accordance with still another aspect of the present invention includes a plurality of lamps emitting a first light. An optical member converts the first light into a second light having enhanced optical characteristics. A reflection plate is positioned under the lamps. The reflection plate reflects the first light toward the optical member. A bottom chassis is placed under the reflection plate to receive the reflection plate and the lamps. The bottom chassis includes a bottom face and sidewalls extending from edges of the bottom face. Also, the bottom chassis has recesses that are formed at surface portions of the bottom chassis that are aligned with each of the lamps.

A liquid crystal display apparatus in accordance with still another aspect of the present invention includes a plurality of lamps emitting a first light. An optical member converts the first light into a second light having enhanced optical characteristics. A receiving member receives the lamps and the optical member. The receiving member has protrusions corresponding to the lamps. The protrusions protrude away from the lamps. A liquid crystal display panel assembly displays an image using the second light. A top chassis is combined with the receiving member to fix the liquid crystal display panel assembly to the receiving member.

A liquid crystal display apparatus in accordance with yet still another aspect of the present invention includes a plurality of lamps emitting a first light. An optical member converts the first light into a second light having enhanced optical characteristics. A reflection plate is positioned under the lamps to reflect the first light to the optical member. A bottom chassis is placed under the reflection plate to receive the reflection plate and the lamps. The bottom chassis includes a bottom face and sidewalls extending from edges of the bottom face. Also, the bottom chassis has recesses that are formed at surface portions of the bottom chassis that are aligned with each of the lamps. A liquid crystal display panel assembly displays an image using the second light. A top chassis is combined with the bottom chassis to fix the liquid crystal display panel assembly to the bottom chassis.

According to the present invention, the distance between the lamps and the receiving member is increased without also increasing the thickness of the LCD apparatus. As a result, the capacitance of the capacitor that forms between the lamps and the receiving member is maintained at a low level and the leakage current of the backlight assembly may be decreased.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF EMBODIMENTS

Figure 1:
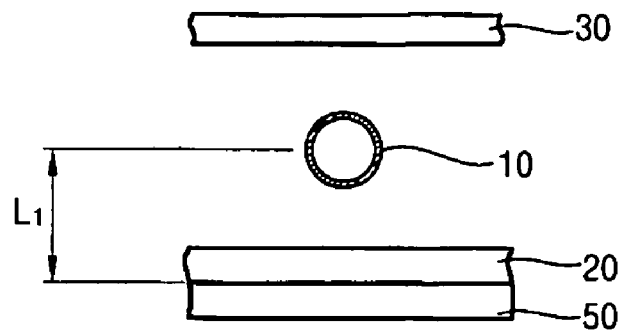
FIG. 1 is a partial cross sectional view illustrating a conventional backlight assembly.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
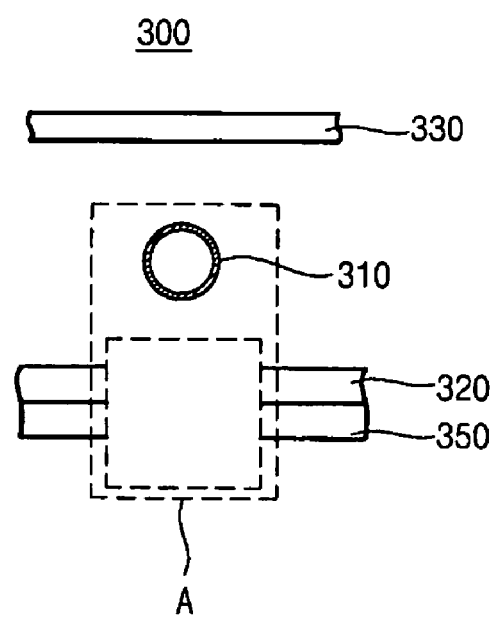
FIG. 2 is a partial cross sectional view illustrating a backlight assembly in accordance with an exemplary embodiment of the present invention.

FIG. 2 is a partial cross sectional view illustrating a backlight assembly in accordance with an exemplary embodiment of the present invention, FIGS. 3A, 3B, 4A, and 4B are enlarged cross sectional views illustrating the portion "A" of FIG. 2 in accordance with different exemplary embodiments of the present invention.

Referring to FIG. 2, a backlight assembly 300 includes a lamp 310, a reflection plate 320, a light diffusing member 330 and a bottom chassis 350. The light-diffusing member 330 is positioned over the lamp 310. The bottom chassis 350 is placed under the lamp 310. Also, the reflection plate 320 is placed on the bottom chassis 350.

Figure 3A:
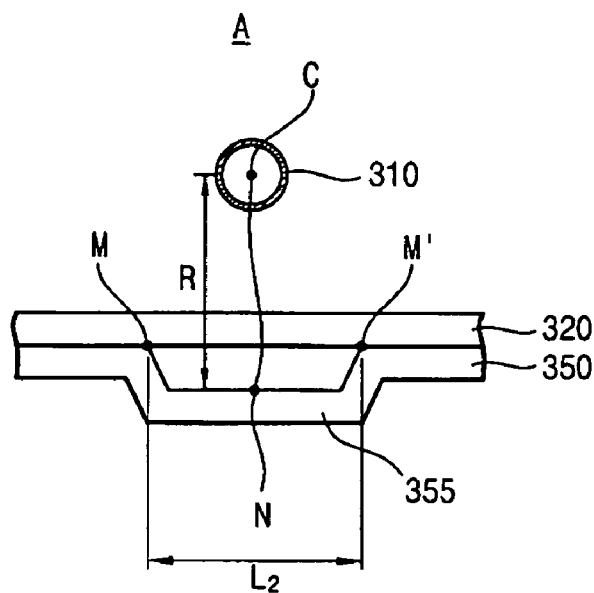
FIG. 3A is an enlarged cross sectional view illustrating a portion "A" in FIG. 2 in accordance with an exemplary embodiment of the present invention.

FIG. 3A is an enlarged cross sectional view illustrating a portion "A" in FIG. 2.

Referring to FIG. 3A, the reflection plate 320 includes a non-conductive material. Also, the bottom chassis 350 has a protrusion 355 downwardly protruding from the bottom chassis 350. That is, the protrusion 355 protrudes in a direction opposite to the lamp 310. Here, the protrusion 355 is vertically aligned with the lamp 310.

In the backlight assembly shown in FIG. 3A, the protrusion 355 has a quadrangular shape. Here, the reflection plate 320 includes a non-conductive material and the reflection plate 320 does not function as an electrode of a capacitor. Thus, the distance between the electrodes of the capacitor corresponds to a distance R between a center point C of the lamp 310 and an upper face of the protrusion 355. Also, the protrusion 355 has a width L2 corresponding to a distance between two points M and M'. Here, the points M and M' correspond to points between the bottom chassis 350 and the protrusion 355. Meanwhile, when the number of the lamp 310 is at least two, the number of the protrusion 355 matches the number of the lamps 310.

Figure 3B:
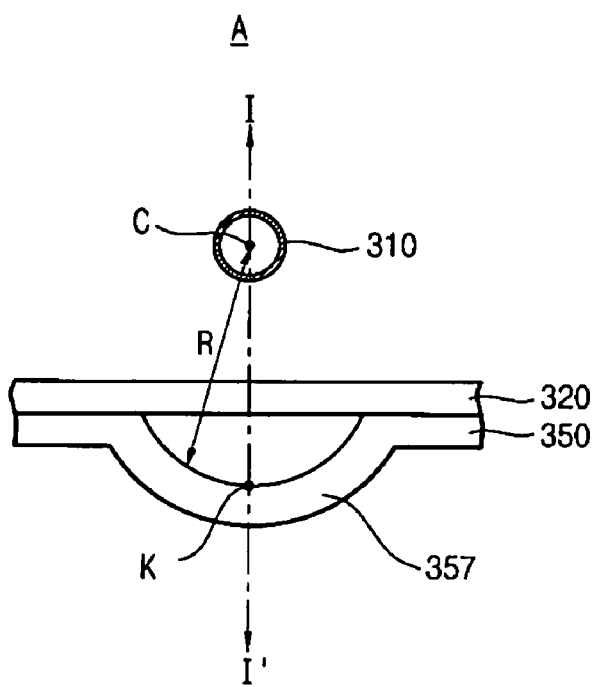
FIG. 3B is an enlarged cross sectional view illustrating a portion "A" in FIG. 2 in accordance with another exemplary embodiment of the present invention.

Alternatively, as shown in FIG. 3B, a protrusion 357 may have an arch shape. Here, the protrusion 357 has a point K on an upper face of the protrusion 357 that is located farthest from the center point C of each of the lamps 310. Also, the point K of the protrusion 357 and the center point C of the lamp 310 are positioned on substantially the same vertical line I-I'. To guarantee a sufficient distance R between the lamp 310 and the protrusion 357, the protrusion 357 having the arch shape has the distance R as a curvature radius from the center point C of the lamps 310. Each of the protrusions 357 has a width corresponding to a distance between two intersection points at which parts of a circle intersects the bottom chassis 350. The partial circle has a radius between the point K of the protrusions 357 and the center point C of the lamps 310. The point K of the protrusions 357 is located farthest from the center point C of each of the lamps 310.

Figure 4A:
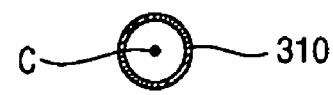
FIG. 4A is an enlarged cross sectional view illustrating a portion "A" in FIG. 2 in accordance with still another exemplary embodiment of the present invention.
Figure 4A:
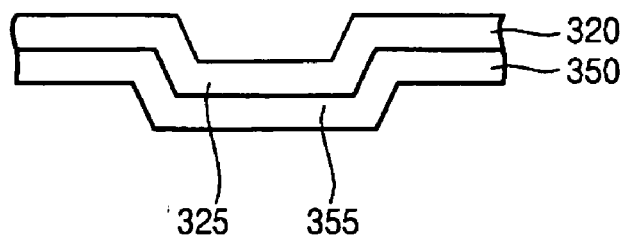

FIG. 4A is an embodiment in which the reflection plate 320 includes a conductive material and functions as the electrode of the capacitor. Thus, a protrusion 325 having a quadrangular shape downwardly protrudes from the reflection plate 320. The protrusion 325 of the reflection plate 320 makes contact with the protrusion 355 having the quadrangular shape of the bottom chassis 350.

Figure 4B:
FIG. 4B is an enlarged cross sectional view illustrating a portion "A" in FIG. 2 in accordance with still another exemplary embodiment of the present invention.
Figure 4B:
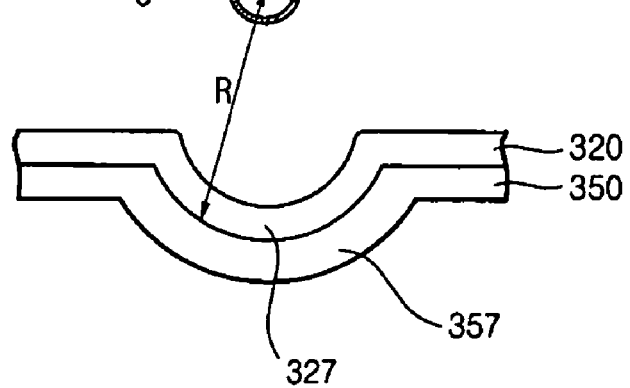

Alternatively, as shown in FIG. 4B, an arch-shaped protrusion 327 downwardly protrudes from the reflection plate 320. The protrusion 327 of the reflection plate 320 makes contact with the protrusion 357, which forms an arch-shaped portion of the bottom chassis 350.

Figure 5:
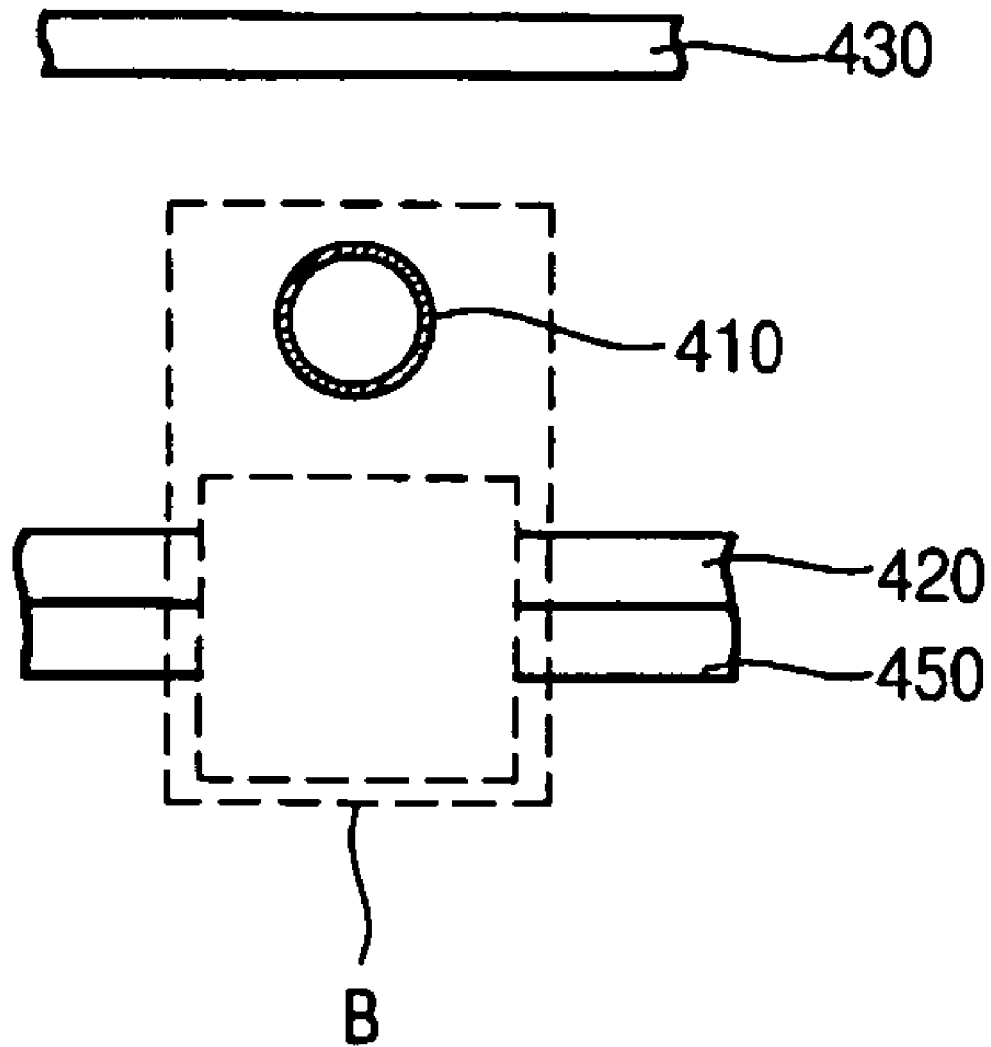
FIG. 5 is a partial cross sectional view illustrating a backlight assembly in accordance with another exemplary embodiment of the present invention.

FIG. 5 is a partial cross sectional view illustrating a backlight assembly in accordance with an exemplary embodiment of the present invention, and is substantially the same as the backlight assembly of FIG. 2 except for the region indicated as "B." FIGS. 6A, 6B, 7A, and 7B are enlarged cross sectional views illustrating the portion "B" of FIG. 2 in accordance with different exemplary embodiments of the present invention.

Referring to FIG. 5, a backlight assembly 400 includes a lamp 410, a reflection plate 420, a light diffusing member 430 and a bottom chassis 450. The light-diffusing member 430 is positioned over the lamp 410. The bottom chassis 450 is placed under the lamp 410. Also, the reflection plate 420 is placed on the bottom chassis 450.

Figure 6A:
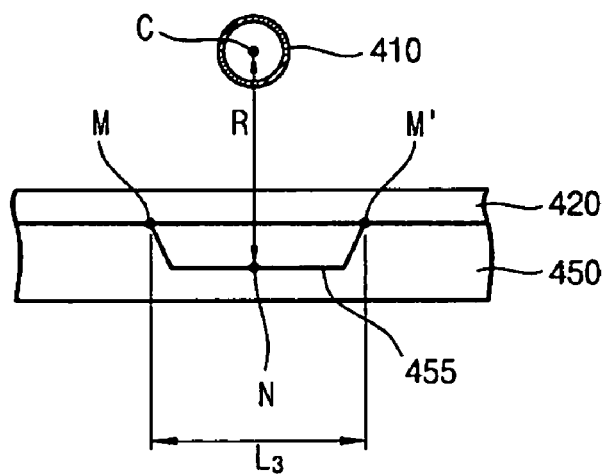
FIG. 6A is an enlarged cross sectional view illustrating a portion "B" in FIG. 2 in accordance with an exemplary embodiment of the present invention.

FIG. 6A is an enlarged cross sectional view illustrating the portion "B" in FIG. 5 in accordance with an exemplary embodiment of the present invention.

In the embodiment of FIG. 6A, the reflection plate 420 includes a non-conductive material. The bottom chassis 450 has a recess 455 that is formed at a surface portion of the bottom chassis 450 facing the lamp 410. In the present embodiment, the recess 455 has a quadrangular shape. Here, since the reflection plate 420 includes a non-conductive material, the reflection plate 420 does not function as an electrode of a capacitor. Thus, the distance between the electrodes of the capacitor corresponds to a distance R between a center point C of the lamp 410 and an upper face of the recess 455 (e.g., point N). The recess 455 has a width L3 corresponding to a distance between two curved points M and M'. Here, the curved points M and M' lie at the interface between the bottom chassis 450 and the recess 455. Meanwhile, when the number of the lamp 410 is at least two, the number of the recess 455 matches the number of the lamps 410.

Figure 6B:
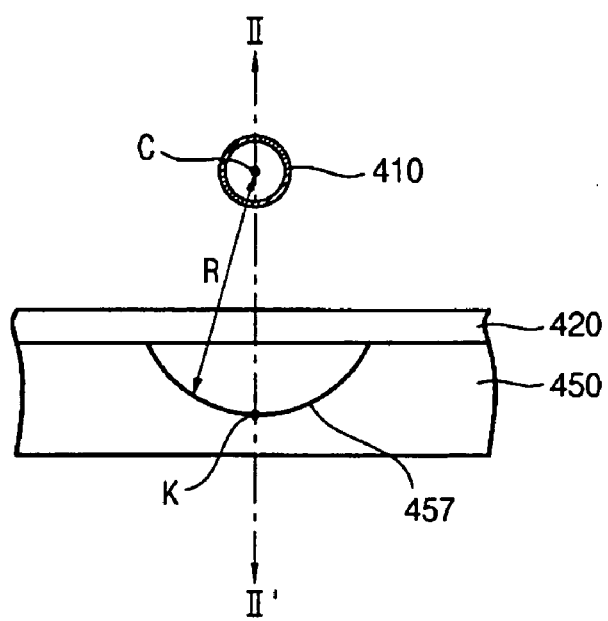
FIG. 6B is an enlarged cross sectional view illustrating a portion "B" in FIG. 2 in accordance with another exemplary embodiment of the present invention.

Alternatively, as shown in FIG. 6B, a recess 457 may have an arch shape. Here, to guarantee a sufficient distance R between the lamp 410 and the recess 457, the recess 457 having the arch shape has the distance R as a curvature radius. Each of the recesses 457 has a width corresponding to a distance between two intersection points at which a partial circle intersects the bottom chassis 450. The partial circle has a radius between the point K of the recesses 457 and the center point C of the lamps 410. The point K of the recesses 457 is located farthest from the center point C of each of the lamps 410. The point K of the recess 457 and the center point C of the lamp 410 are positioned on a substantially same vertical line II-II'.

Figure 7A:
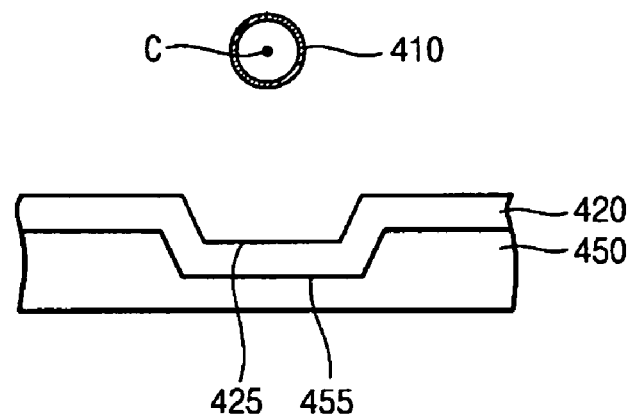
FIG. 7A is an enlarged cross sectional view illustrating a portion "B" in FIG. 2 in accordance with still another exemplary embodiment of the present invention.

In the embodiment of FIG. 7A, the reflection plate 420 includes a conductive material and functions as the electrode of the capacitor. Thus, a protrusion 425 having a quadrangular shape downwardly protrudes from the reflection plate 420. The protrusion 425 of the reflection plate 420 makes contact with the upper face of the recess 455 having the quadrangular shape of the bottom chassis 450.

Figure 7B:
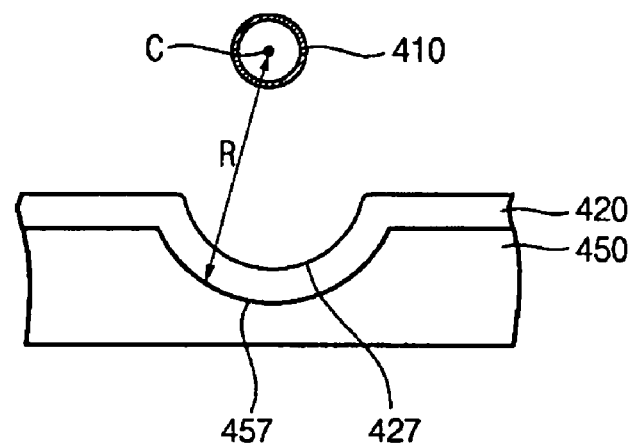
FIG. 7B is an enlarged cross sectional view illustrating a portion "B" in FIG. 2 in accordance with still another exemplary embodiment of the present invention.

Alternatively, as shown in FIG. 7B, a protrusion 427 having an arch shape downwardly protrudes from the reflection plate 420. The protrusion 427 of the reflection plate 420 makes contact with the arch-shaped recess 457 forming the upper face of the bottom chassis 450.

Figure 8:
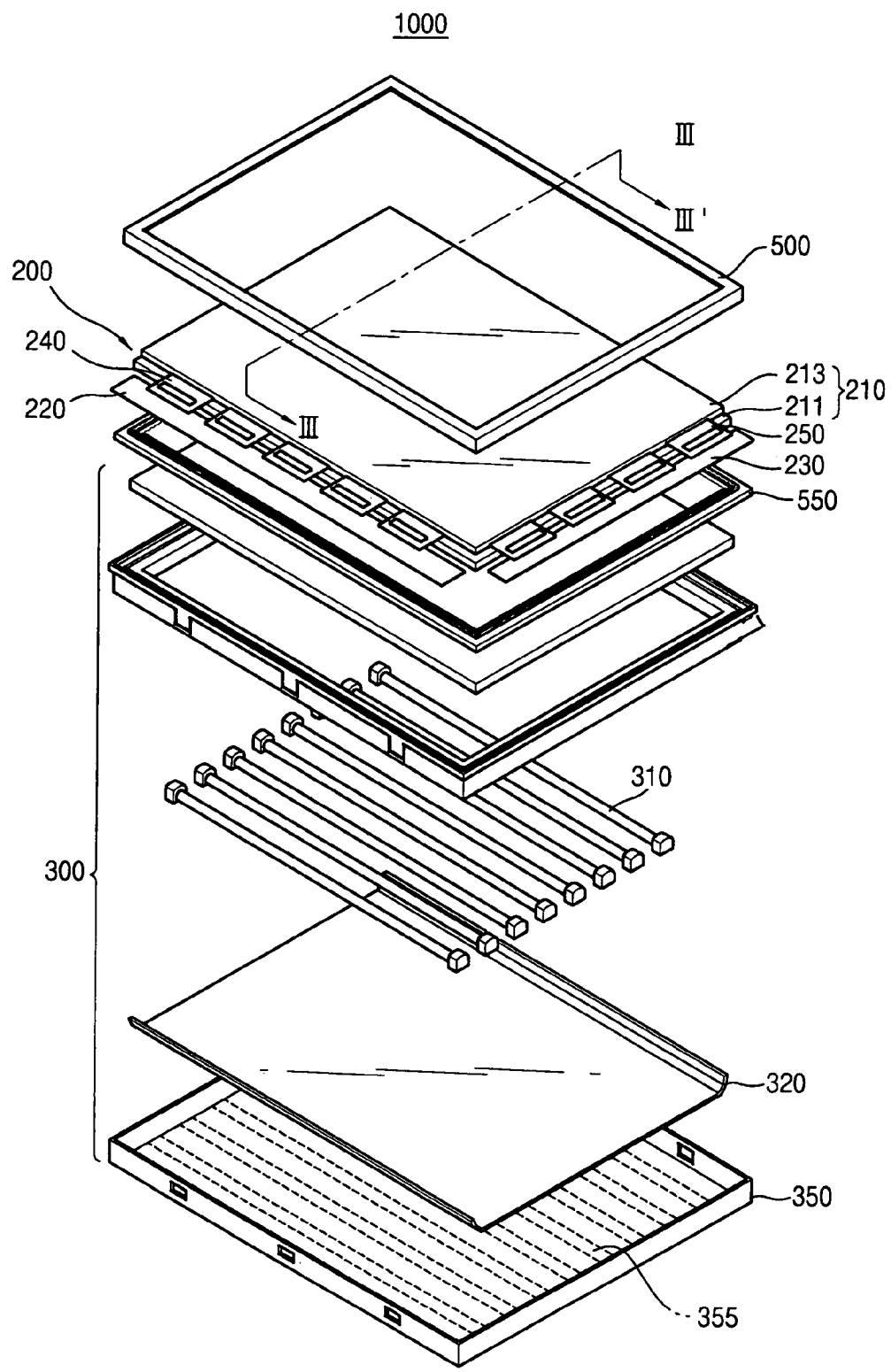
FIG. 8 is an exploded perspective view illustrating an LCD apparatus in accordance with an exemplary embodiment of the present invention.
Figure 9A:
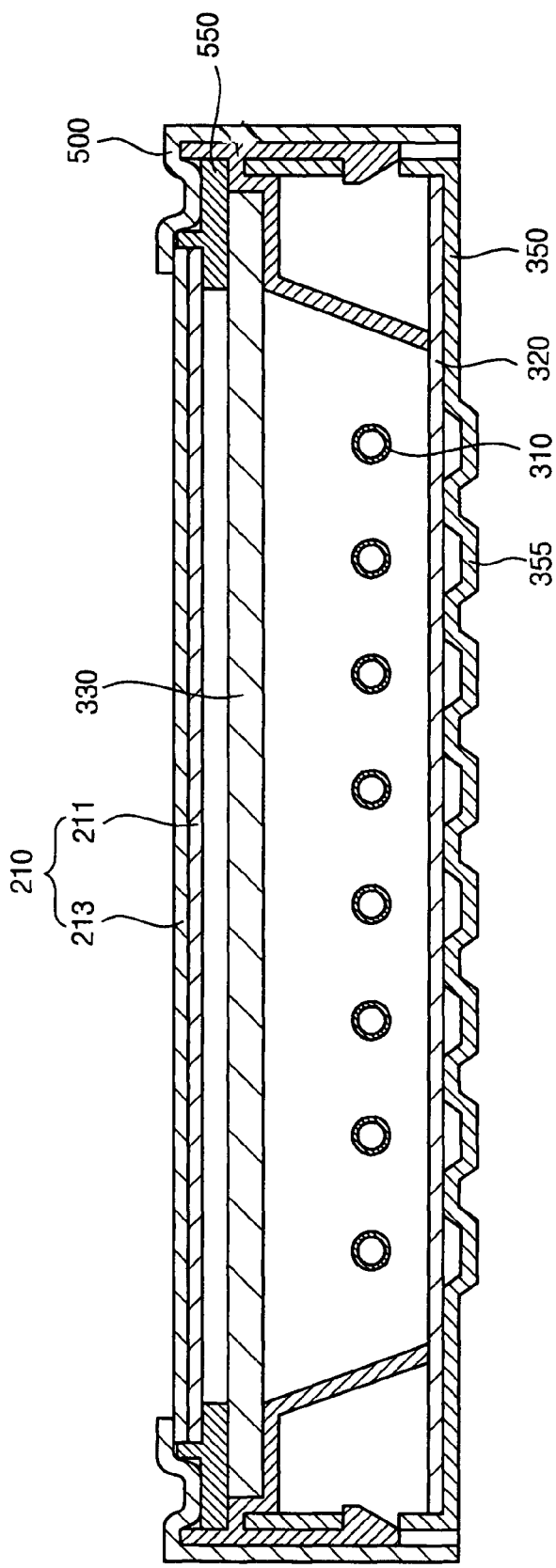
FIG. 9A is a cross sectional view taken along a line III-III' in FIG. 8.
Figure 9B:
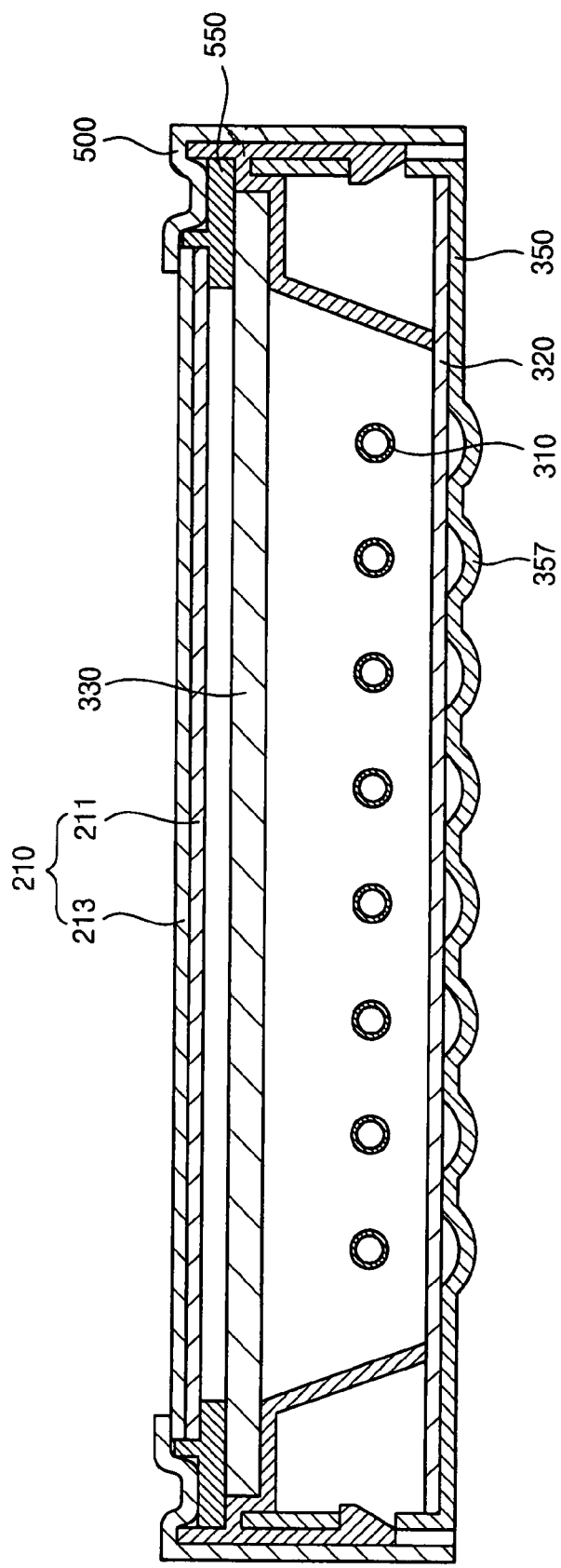
FIG. 9B is a cross sectional view illustrating an LCD apparatus in accordance with another exemplary embodiment of the present invention.
Figure 10A:
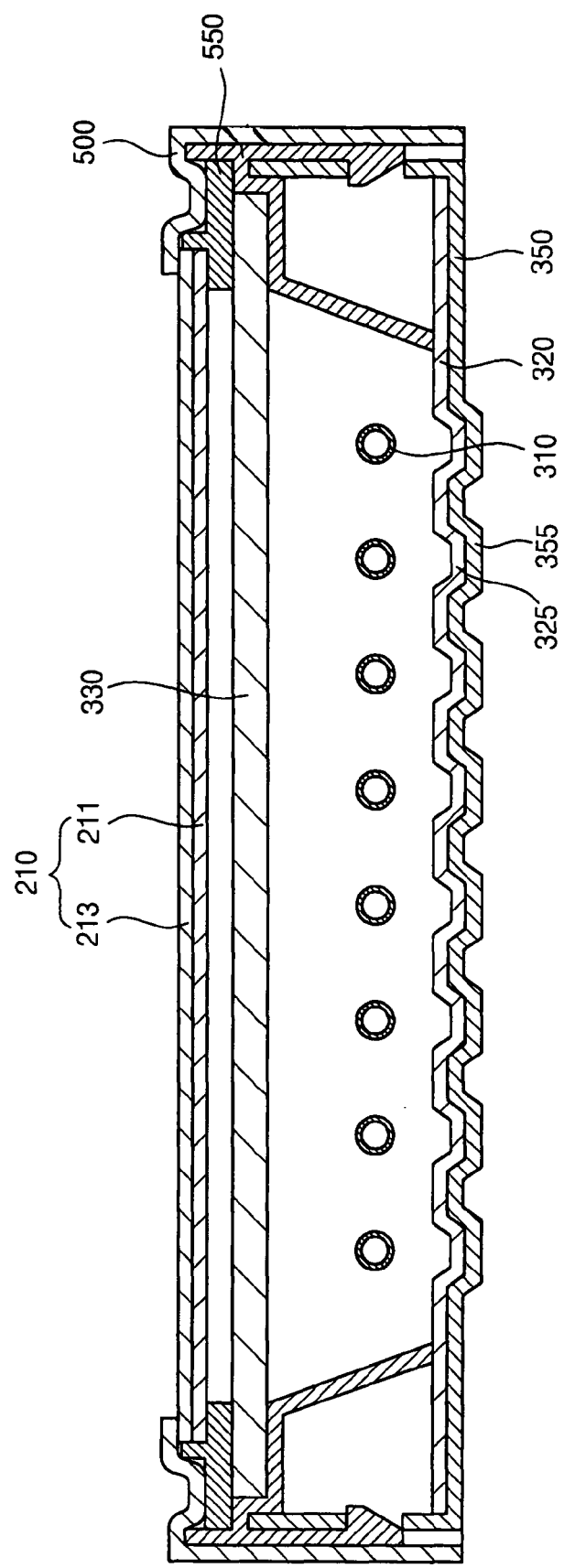
FIG. 10A is a cross sectional view illustrating an LCD apparatus in accordance with still another exemplary embodiment of the present invention.
Figure 10B:
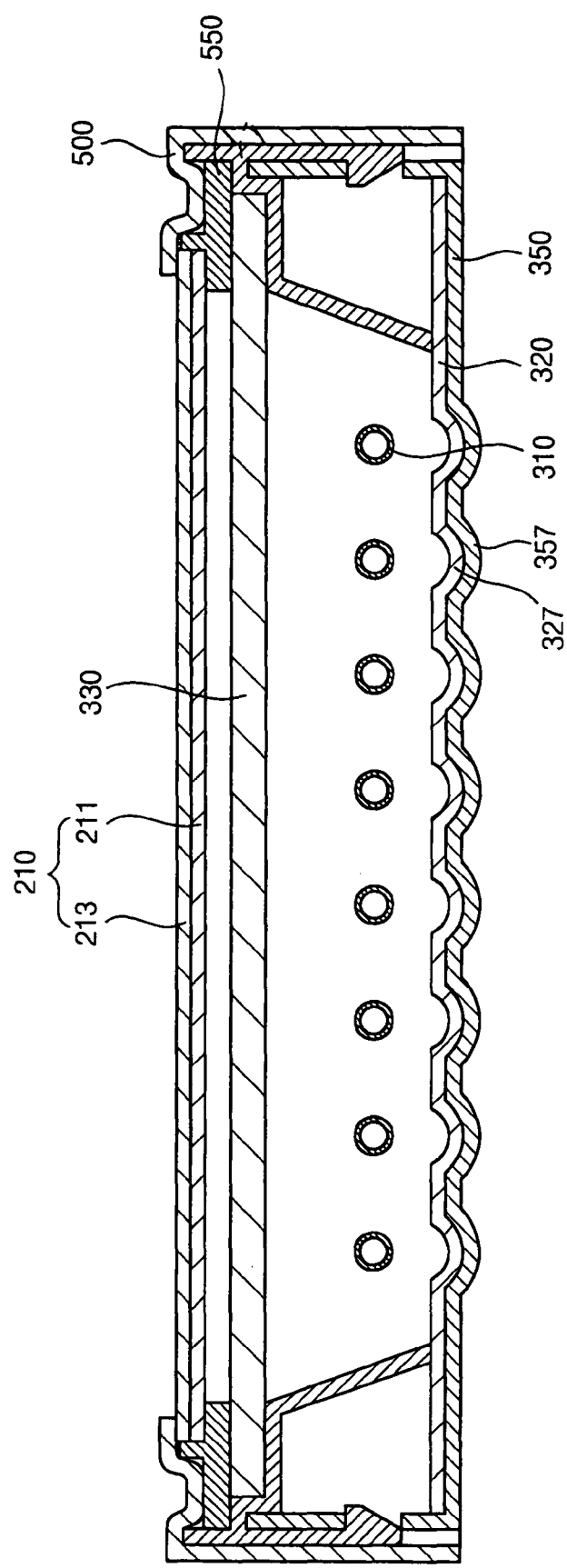
FIG. 10B is a cross sectional view illustrating an LCD apparatus in accordance with still another exemplary embodiment of the present invention.
Figure 13:
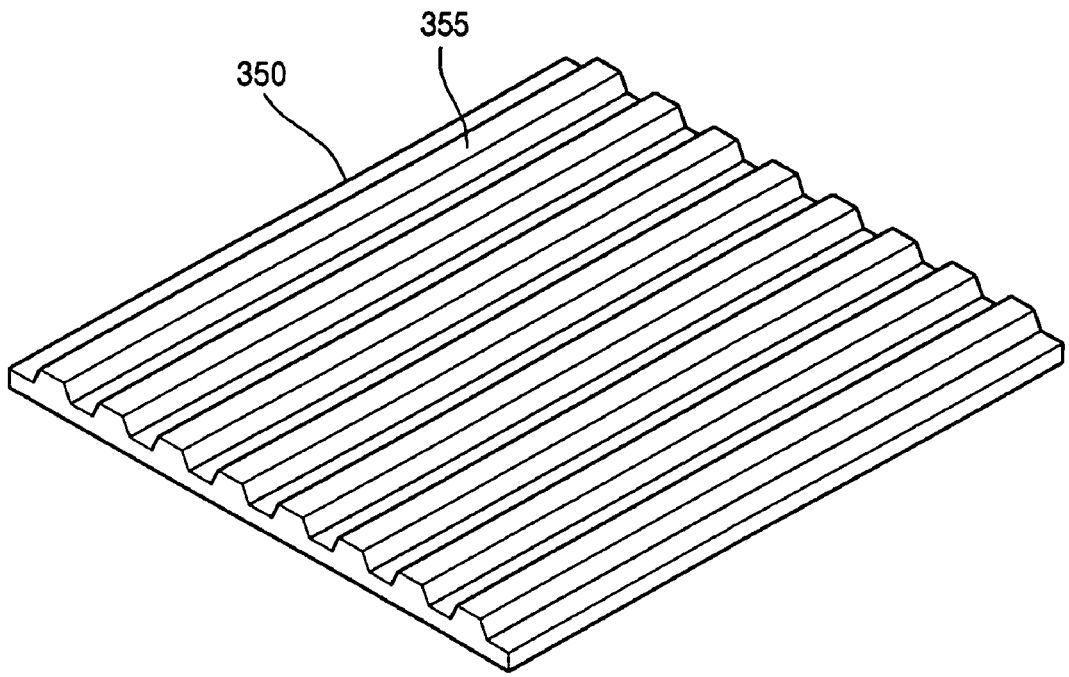
FIG. 13 is a perspective view illustrating a bottom chassis of an LCD apparatus in FIG. 8.
Figure 14:
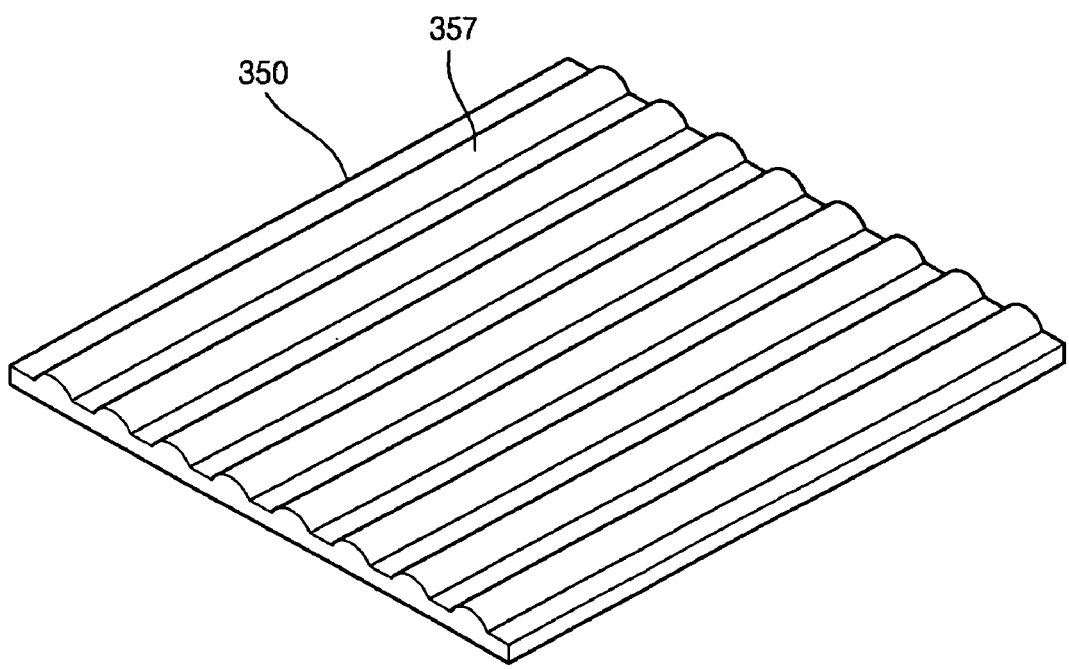
FIG. 14 is a perspective view illustrating a bottom chassis of an LCD apparatus in accordance with an exemplary embodiment of the present invention.
Figure 15:
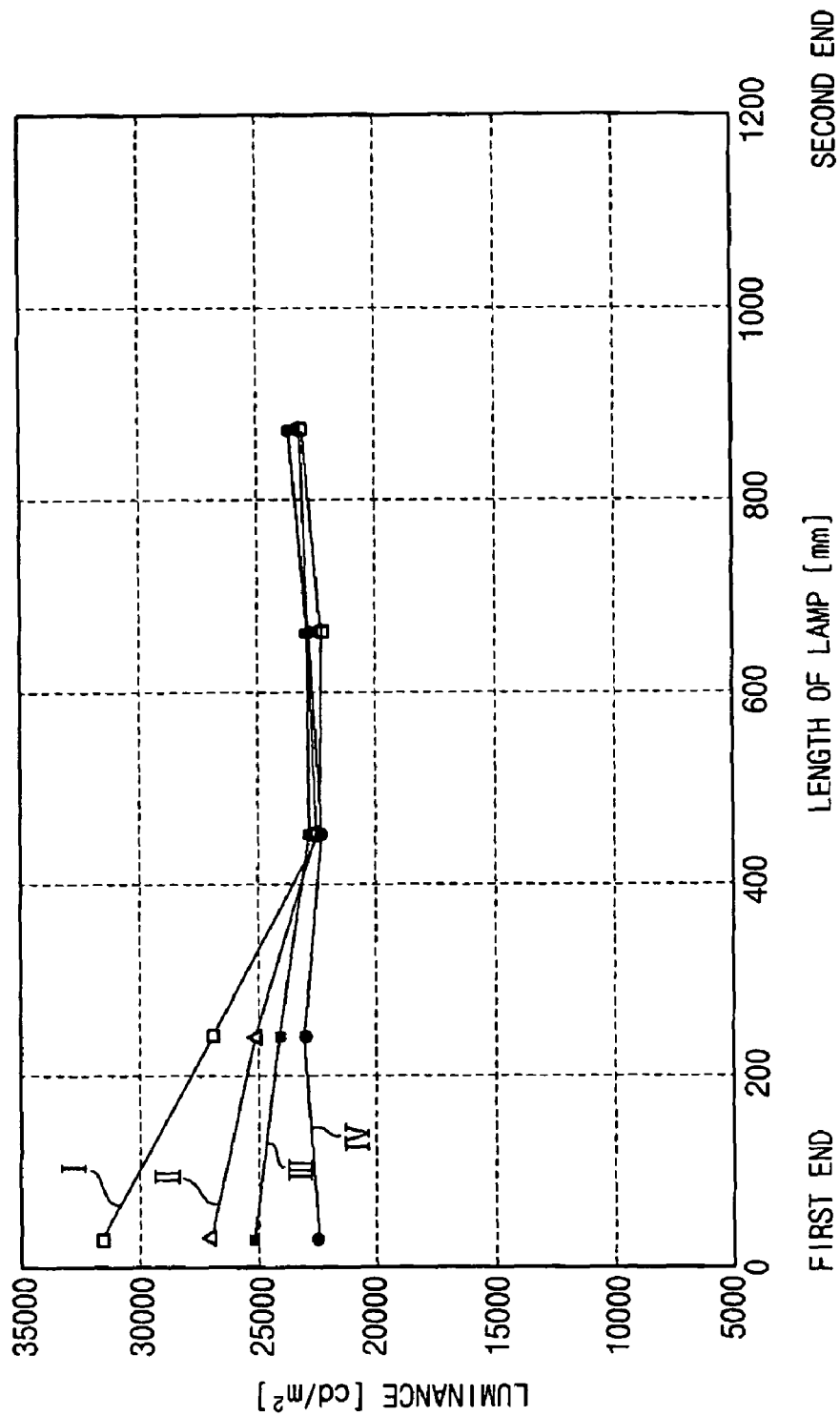
FIG. 15 is a graph illustrating luminance variations in accordance with a length of a lamp of the backlight assembly in FIG. 1

FIG. 8 is an exploded perspective view illustrating an LCD apparatus in accordance with an exemplary embodiment of the present invention. FIGS. 9A, 9B, 10A, and 10B are cross sectional views of different exemplary embodiments taken along a line III-III' in FIG. 8. FIG. 13 is a perspective view illustrating a bottom chassis of an LCD apparatus in FIG. 8, and FIG. 14 is a perspective view illustrating a bottom chassis of an LCD apparatus in accordance with an exemplary embodiment of the present invention.

Referring to FIGS. 8 to 10B, an LCD apparatus 1000 includes an LCD panel assembly 200 displaying an image, and a backlight assembly 300 providing a light to the LCD panel assembly 200.

The LCD panel assembly 200 includes an LCD panel 210, a first printed circuit board (PCB) 220, a second PCB 230, a first tape carrier package (TCP) 240 electrically connected to the first PCB 220, and a second TCP 250 electrically connected to the second PCB 230. The backlight assembly 300 further includes a middle chassis 550 and a top chassis 500.

The LCD panel 210 includes a thin film transistor (TFT) substrate 211, a color filter substrate 213 facing the TFT substrate 211, and an LC layer (not shown) interposed between the TFT substrate 211 and the color filter substrate 213.

The TFT substrate 211 includes a glass substrate on which TFTs are arranged in a matrix pattern. The TFT substrate 211 includes source terminals electrically connected to data lines and gate terminals electrically connected to gate lines. Pixel electrodes including transparent ITO are formed on drain terminals.

The color filter substrate 213 is positioned over the TFT substrate 211. The color filter substrate 213 has at least one color pixel member including a red pixel portion, a green pixel portion and a blue pixel portion. When the light rays pass through the color pixel member, the color of the light may change. The color pixel member may be formed in the color filter substrate 213 by a thin film process. A front face of the color filter substrate 213 is covered with a common electrode including a transparent conductive material such as ITO.

The first and second PCBs 220 and 230 are connected to the first and second TCP 240 and 250, respectively. The first and second PCBs 220 and 230 receive external image signals and then provide the gate line and the data line with drive signals. In order to operate the LCD device 1000, the first and second PCBs 220 and 230 generate gate and data drive signals, respectively. In addition, the first and second PCBs 220 and 230 generate a plurality of timing signals enabling the gate drive signal and the data drive signal to be applied to the gate line and the data line at a desired timing. The gate drive signal and the data drive signal may be applied to the gate line and the data line through the first TCPs 240 and 250, respectively.

Here, the backlight assembly 300 includes the bottom chassis 350 having the protrusion 355 in FIG. 13 or the protrusion 357 in FIG. 14. The backlight assembly 300 is illustrated in detail with reference to FIGS. 2 to 4B. Thus, any further illustrations with respect to the backlight assembly 300 are omitted herein.

FIGS. 11A, 11B, 12A, and 12B are cross sectional views illustrating an LCD apparatus in accordance with various exemplary embodiments of the present invention,.

The LCD apparatus of FIGS. 11A, 11B, 12A, and 12B includes elements substantially identical to those of the LCD apparatus in FIG. 8 except for a bottom chassis and a reflection plate. Thus, same reference numerals refer to the same elements and any further illustrations with respect to the same elements will be omitted.

Figure 11A:
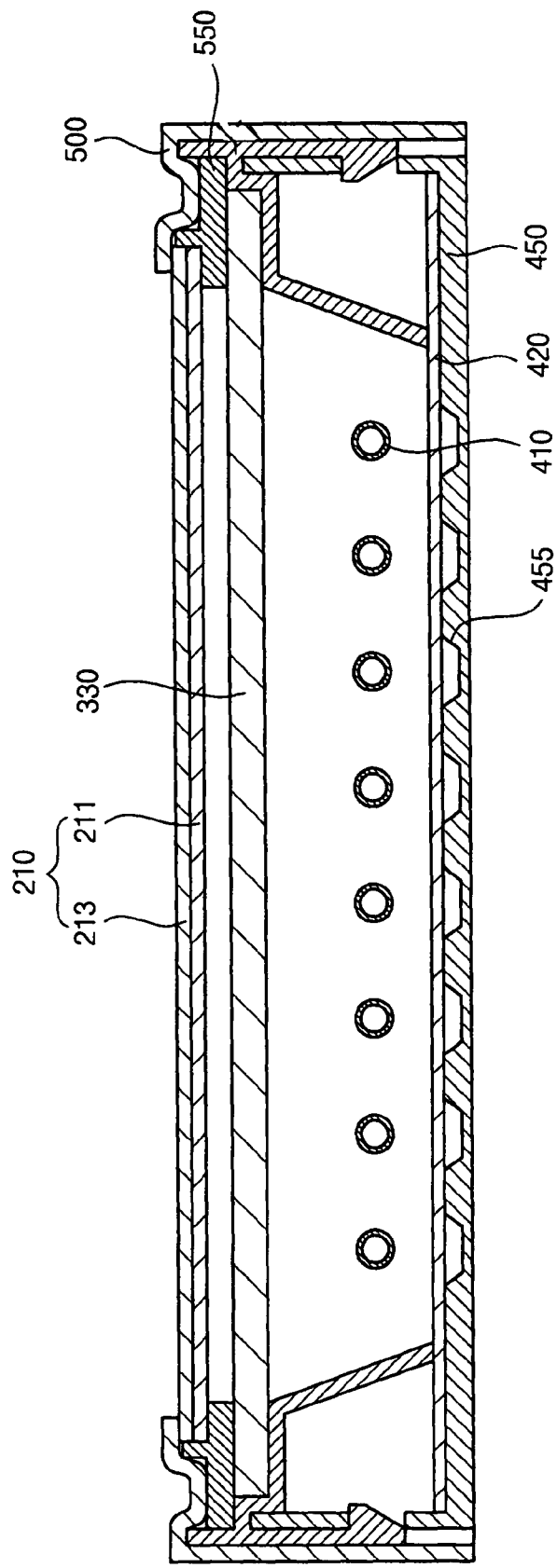
FIG. 11A is a cross sectional view illustrating an LCD apparatus in accordance with still another exemplary embodiment of the present invention.
Figure 11B:
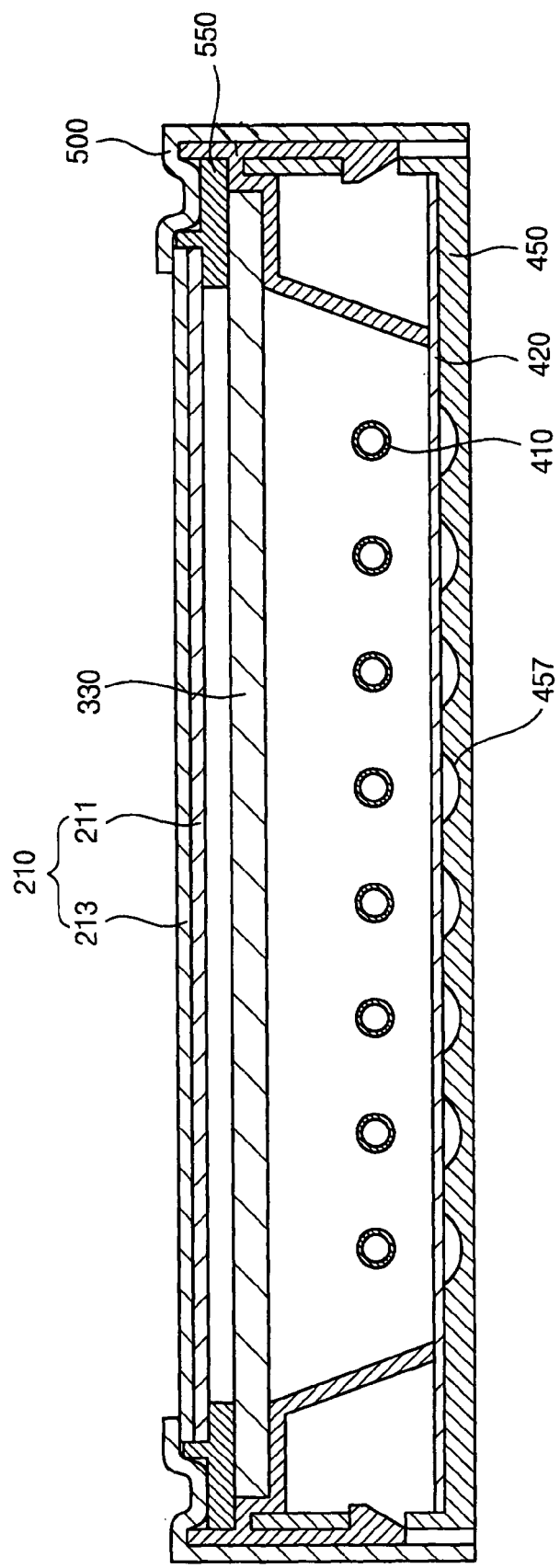
FIG. 11B is a cross sectional view illustrating an LCD apparatus in accordance with still another exemplary embodiment of the present invention.
Figure 12A:
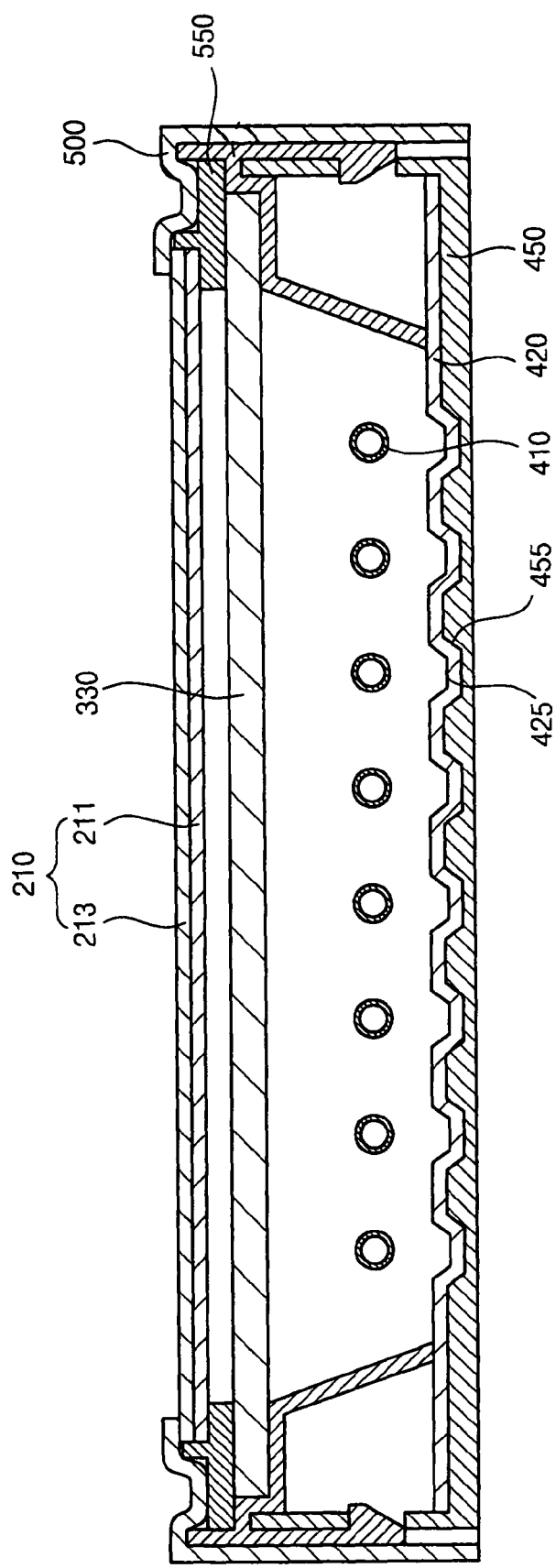
FIG. 12A is a cross sectional view illustrating an LCD apparatus in accordance with still another exemplary embodiment of the present invention.
Figure 12B:
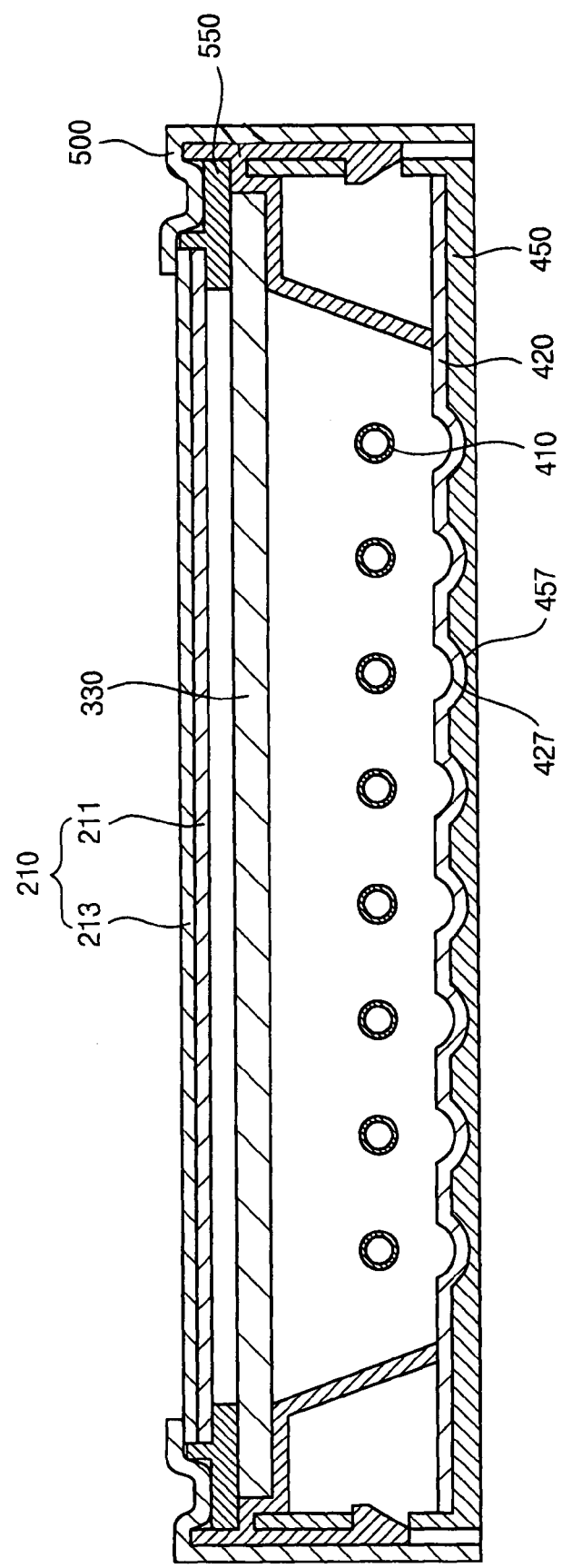
FIG. 12B is a cross sectional view illustrating an LCD apparatus in accordance with still another exemplary embodiment of the present invention.

The LCD apparatus 1200 in FIG. 11A includes the bottom chassis 450 having the quadrangular recess 455. The LCD apparatus in FIG. 11B includes the bottom chassis 450 having the arch recess 457. The LCD apparatus 1300 in FIG. 12A includes the bottom chassis 450 having the quadrangular recess 455 and the reflection plate 420 having the quadrangular protrusion 425. Also, the LCD apparatus 1300 in FIG. 12B includes the bottom chassis 450 having the arch recess 457 and the reflection plate 420 having the arch protrusion 427.

According to the present invention, a receiving member has the protrusion or the recess aligned with the lamps so that the distance between the receiving member and the lamps may be lengthened. As a result, a capacitor may not be formed between the receiving member and the lamps and a leakage current of the lamps may be reduced.

Having described the exemplary embodiments of the present invention and its advantages, it is noted that various changes, substitutions and alterations can be made herein without departing from the spirit and scope of the invention as defined by appended claims.

What is claimed is:

1. A backlight assembly comprising:
a plurality of lamps emitting a first light;
an optical member converting the first light to a second light having enhanced optical characteristics; and
a receiving member including a reflection plate positioned under the lamps and a bottom chassis placed under the reflection plate and at least partially enclosing the lamps and the optical member, the receiving member including a bottom plate and having protrusions that are positioned to correspond to the positions of the lamps, the protrusions extending and protruding from the bottom plate in a direction away from the lamps,
wherein the protrusions are provided at the bottom chassis, and
the reflection plate has a flat lower face to form a space between the flat lower face of the reflection plate and the protrusions.

2. The backlight assembly of claim 1, wherein each of the protrusions has a point on its face and the point is located farthest from a center point of each of the corresponding one of the lamps, and the point and the center point of the corresponding one of the lamps are positioned on a substantially same vertical line.

3. The backlight assembly of claim 1, wherein the protrusions have cross sections aligned with cross sections of the lamps.

4. The backlight assembly of claim 1, wherein each protrusions has a quadrangular shape.

5. The backlight assembly of claim 1, wherein each of the protrusions has a width corresponding to a distance between two intersection points at which a partial circle intersects the receiving member, the partial circle having a radius between a point of the protrusion and a center point of the corresponding lamps, and the point of the protrusions being located farthest from the center point of each of the lamps.

6. The backlight assembly of claim 1, wherein each protrusions have an arch-shaped cross section.

7. The backlight assembly of claim 6, wherein each of the protrusions having the arch-shaped cross section has a curvature radius from a center point of each of the lamps.

8. The backlight assembly of claim 1, wherein the reflection plate reflects the first light toward the optical member, and
the bottom chassis receives the reflection plate and the lamps and includes a bottom face and sidewalls extending from edges of the bottom face.

9. The backlight assembly of claim 8, wherein the reflection plate includes a non-conductive material.

10. The backlight assembly of claim 8, wherein the reflection plate includes a conductive material, and the protrusions are provided at the reflection plate and the bottom chassis.

11. A backlight assembly comprising:
a plurality of lamps emitting a first light;
an optical member converting the first light to a second light having enhanced optical characteristics;
a reflection plate positioned under the lamps, the reflection plate reflecting the first light toward the optical member; and
a bottom chassis placed under the reflection plate to receive the reflection plate and the lamps, the bottom chassis including a bottom face forming a solid and sidewalls extending from edges of the bottom face, and the bottom face having recesses extending from the bottom chassis and positioned such that the position of each of the recesses corresponds to the position of one of the lamps, and
the reflection plate has a flat lower face to form a space between the flat lower face of the reflection plate and the recesses.

12. The backlight assembly of claim 11, wherein each of the recesses has a point on its face and the point is located farthest from a center point of a corresponding one of the lamps, and the point of the recesses and the center point of the corresponding lamps are positioned on a substantially same vertical line.

13. The backlight assembly of claim 11, wherein the recesses have cross sections aligned with cross sections of the lamps.

14. The backlight assembly of claim 11, wherein each of the recesses has a quadrangular shape.

15. The backlight assembly of claim 11, wherein each of the recesses has a width corresponding to a distance between two intersection points at which a partial circle intersects the bottom chassis, the partial circle having a radius between a apex of the recesses and a center point of the corresponding lamps.

16. The backlight assembly of claim 11, wherein the reflection plate includes a non-conductive material.

17. The backlight assembly of claim 11, wherein the reflection plate has second recesses making contact with the recesses of the bottom chassis.

18. The backlight assembly of claim 11, wherein the recesses have an arch-shaped cross section.

19. The backlight assembly of claim 18, wherein each of the recesses having the arch-shaped cross section has a curvature radius from a center point of each of the lamps.

20. A liquid crystal display apparatus comprising:
a plurality of lamps emitting a first light;
an optical member converting the first light to a second light having enhanced optical characteristics;
a reflection plate positioned under the lamps;
a receiving member at least partially enclosing the lamps and the optical member, the receiving member having protrusions corresponding to the lamps, the protrusions protruding in a direction away from the lamps wherein the receiving member comprises a bottom face forming a solid having the protrusions;
a liquid crystal display panel assembly displaying an image using the second light; and
a top chassis combined with the receiving member to fix the liquid crystal display panel assembly to the receiving member,
wherein the reflection plate has a flat lower face to form a space between the flat lower face of the reflection plate and the protrusions.

21. A liquid crystal display apparatus comprising:
a plurality of lamps emitting a first light;
an optical member converting the first light to a second light having enhanced optical characteristics;
a reflection plate positioned under the lamps, the reflection plate reflecting the first light to the optical member;
a bottom chassis placed under the reflection plate to receive the reflection plate and the lamps, the bottom chassis including an imperforated bottom face and sidewalls extending from edges of the bottom face, and the bottom face having recesses extending from the bottom chassis and corresponding with the positions of the lamps;
a liquid crystal display panel assembly displaying an image using the second light; and
a top chassis combined with the bottom chassis to fix the liquid crystal display panel assembly to the bottom chassis,
wherein the bottom chassis has protrusions that are positioned to correspond to the positions of the lamps; and
the reflection plate has a flat lower face to form a space between the flat lower face of the reflection plate and the protrusions.

22. A backlight assembly comprising:
a plurality of lamps generating light; and
a metal container that receives the lamps, the metal container including a reflection plate positioned under the lamps, and a bottom plate having first regions and second regions positioned between the first regions, the lamps being disposed over the first regions such that the position of each of the lamps corresponds to one of the first regions, wherein a distance between a virtual plane and the first regions of the bottom plate is greater than a distance between the virtual plane and the second regions of the bottom plate, the virtual plane being parallel to the bottom plate and passing through a center of the lamp, and the second regions are integrally formed with the first regions, the bottom plate has protrusions that are positioned to correspond to the positions of the lamps, and the reflection plate has a flat lower face to form a space between the flat lower face of the reflection plate and the protrusions.

23. The backlight assembly of claim 22, wherein the first regions are recessed with respect to the second regions.

24. The backlight assembly of claim 22, wherein the first regions and the second regions have substantially the same thickness.

25. The backlight assembly of claim 22, wherein each of the lamps is positioned over the protrusion of the bottom plate.

* * * * *